(12) United States Patent
Bello Larroche et al.

(10) Patent No.: US 12,195,956 B2
(45) Date of Patent: Jan. 14, 2025

(54) ELECTRONIC TAP CARTRIDGE WITH MAGNETIC TRIAXIAL SENSOR FOR DETECTING THE POSITION OF THE CONTROLLER OR HANDLE AND ELECTRONIC TAP CONTAINING IT

(71) Applicant: SEDAL, S. L.U., Sant Andreu de la Barca (ES)

(72) Inventors: Rafael Bello Larroche, Martorell (ES); Isaac Salas Arranz, Sant Cugat del Vallès (ES)

(73) Assignee: SEDAL, S. L.U., Sant Andreu de la Barca (ES)

( * ) Notice: Subject to any disclaimer, the term of this patent is extended or adjusted under 35 U.S.C. 154(b) by 228 days.

(21) Appl. No.: 17/431,746

(22) PCT Filed: Feb. 18, 2020

(86) PCT No.: PCT/ES2020/070117
§ 371 (c)(1),
(2) Date: Aug. 18, 2021

(87) PCT Pub. No.: WO2020/169867
PCT Pub. Date: Aug. 27, 2020

(65) Prior Publication Data
US 2022/0154436 A1 May 19, 2022

(30) Foreign Application Priority Data
Feb. 18, 2019 (ES) .............................. ES201930127

(51) Int. Cl.
*E03C 1/05* (2006.01)
*E03C 1/04* (2006.01)

(52) U.S. Cl.
CPC ............ *E03C 1/055* (2013.01); *E03C 1/0412* (2013.01)

(58) Field of Classification Search
CPC ... E03C 1/055; F16K 37/0033; F16K 37/0041
See application file for complete search history.

(56) References Cited

U.S. PATENT DOCUMENTS

| 11,346,459 B1* | 5/2022 | Peng ................... F16K 37/0041 |
| 2006/0130908 A1* | 6/2006 | Marty ................. F16K 37/0041 |
| | | 137/613 |

(Continued)

FOREIGN PATENT DOCUMENTS

| JP | 2009114795 A | 5/2009 | |
| WO | WO-2009019731 A2 * | 2/2009 | ............. E03C 1/055 |

OTHER PUBLICATIONS

International Search Report for International Patent Application No. PCT/ES2020/070117; European Patent Office; Rijswijk, Netherlands; date of mailing Jun. 18, 2020.

(Continued)

*Primary Examiner* — Reinaldo Sanchez-Medina
(74) *Attorney, Agent, or Firm* — Thomas E. Lees, LLC

(57) ABSTRACT

The present invention relates to an electronic tap cartridge which includes a magnetic sensor on the three Cartesian axes for the detection of the position of the controller or handle, by measuring on the said three Cartesian axes the magnetic field generated by a magnet-type element attached to the turning and rotating movement of the controller and handle, determining in an electronic way the regulation set by the user with the movement of the controller or handle, transmitting it to the corresponding devices that perform the mixing and regulate the flow of supply, the invention also referring to the tap containing said cartridge with the magnetic triaxial sensor.

9 Claims, 3 Drawing Sheets

(56) References Cited

U.S. PATENT DOCUMENTS

2018/0106022 A1\* 4/2018 Kamiyoshi ............. F16K 11/18
2018/0313069 A1 11/2018 Cipriani et al.

OTHER PUBLICATIONS

Written Opinion of the International Searching Authority for International Patent Application No. PCT/ES2020/070117; European Patent Office; Rijswijk, Netherlands; date of mailing Jun. 18, 2020.
Melexis; "MLX90333 Position Sensor"; XP055698103; located at URL:https://www.melexis.com/-/media/files/documents/datasheets/mlx90333-datasheet-melexis.pdf; Sep. 20, 2017.

\* cited by examiner

ELECTRONIC TAP CARTRIDGE WITH MAGNETIC TRIAXIAL SENSOR FOR DETECTING THE POSITION OF THE CONTROLLER OR HANDLE AND ELECTRONIC TAP CONTAINING IT

CROSS-REFERENCE TO RELATED APPLICATIONS

This is a § 371 National Stage Entry application of International Application Serial No. PCT/ES2020/070117, filed Feb. 18, 2020, which claims the benefit of Spanish Application No. P201930127, filed Feb. 18, 2019, the disclosures of which are hereby incorporated by reference.

The present invention relates to an electronic tap cartridge which includes a magnetic sensor on the three Cartesian axes to detect the position of the controller or handle, as well as to the tap containing said cartridge with the magnetic sensor, for electronically determining the flow and mixing made by the tap user, and to send it to the corresponding devices which perform the mixing and regulate the supply flow.

BACKGROUND

Within the category of taps with electronic functions, taps which allow the electronic regulation of the supply parameters of the liquids that circulate through it are known.

These electronic control devices are usually based on controllers specially designed for this purpose, with specific buttons or knobs, which are usually located outside the liquid supply tap itself and which send the set point information provided by the user to the devices associated with the regulation of the liquid mixture and the flow regulation, so that they act on the electrically operated valves of each of the liquids to be mixed, the mixture of which will be supplied to the tap.

As it is already widely known, the traditional mechanism of movement of taps with a single controller or handle for the mechanical regulation of mixing and flow of the liquid to be supplied, acts on a mixing cartridge, transmitting directly or by means of a kinematic chain, the movement of the controller or handle to the internal mixing cartridge. This motion transmission is usually done through a cam that directly and/or indirectly moves the mobile disc of the mixing and flow regulation cartridge. With this configuration, a mechanical regulation and mixing of the liquid in the cartridge itself is obtained, according to the set point made by the user.

The use of electronic regulation in taps that have a traditional regulation configuration by means of a controller or handle, wherein this controller or handle transmits its movement to the interior of the tap, makes it necessary for the position of the handle to be determined at each moment, in order to know the set point given by the user. Each of these positions is associated with liquid mixing and/or supply flow values, wherein this information is transmitted to the devices in charge of mixing and flow regulation, corresponding to the conditions set by the user through the operation of the handle.

In order to determine the position of the handle at any given moment, cartridge configurations are known and therefore form part of the state of the art, in which, in order to detect the lifting movement of the handle, a magnet is incorporated into the rotating drive element of its mobile disc, which in turn is attached to the handle as it moves, the magnetic field of this magnet being detected by a magnetic field sensor in its mobile disc. Similarly, to detect the turning movement of the handle, it is necessary to incorporate a second magnet in a different and static location, detecting the magnetic field of this second magnet by a second magnetic field sensor on the mobile disc. Thus, the mechanism of the cartridge allows and requires the relative movement between the two magnets and requires the existence of two sensors, with different locations in relation to each other.

As indicated, this known configuration requires the use of two magnet/sensor sets in order to establish a handle position. In addition to this plurality of magnets and sensors, the existence of two magnets that create magnetic field close to each other with relative movement between them, can cause each of the sensors, in addition to detecting the magnetic field of its associated magnet, to be influenced by the other magnetic field, variable, of the other magnet associated with the other sensor.

At the same time, the detection sensors and/or part of the electronics of the known configurations are necessarily located in mobile components, negatively affecting the backlash of the magnet and sensor carrying parts to the relative positioning accuracy between these elements, and making it necessary to route the electrical connections of these electronics to fixed terminals of the cartridge, this routing being subject to friction and mechanical fatigue by this movement of its support, with the consequent greater likelihood of failure of the electronic system. Some of these sensors are necessarily located in areas close to the walls of the cartridge and therefore of the tap, being susceptible to disturbances from external magnetic fields, and therefore not related to these magnets in the cartridge.

BRIEF SUMMARY

The purpose of the present invention is to provide an electronic tap cartridge with a magnetic triaxial sensor, in the three Cartesian axes, to detect and determine the position of the controller or handle. The purpose of the invention is also an electronic tap containing it, which manages to configure a new and advantageous product, presenting the advantages and the resolution of inconveniences of the state of the art that will be described below.

In this description, when a magnetic field detection sensor is cited, it comprises both the configuration of three uniaxial magnetic field sensors oriented in normal directions within a single housing allowing them to be placed in close proximity to each other, and any equivalent solution of combining uniaxial or biaxial magnetic sensors in separate housings, allowing them to be grouped together in a very small space in such a way that they are significantly close together and oriented in normal directions to each other, so that the magnetic field strength can be measured practically at one point in space. The names magnetic sensor or magnetic field detection sensor, as well as magnetic triaxial sensor or magnetic sensor on the three Cartesian axes, shall be used interchangeably as homonyms, with the same meaning.

Similarly, when the term magnetic field generating element or magnet is cited in this description, it includes the existence of one or more elements capable of generating a magnetic field, which will usually consist of one or more magnets without relative movement between them, with the aim of obtaining the magnetic field required for the application.

In accordance with the purpose of the invention, according to a first aspect, the present invention provides an electronic tap cartridge with a magnetic triaxial sensor for the detection of the position of the controller or handle, which is installed on an electronic tap and to which a controller or handle is attached with at least a turning and inclination movement for the manual regulation of the liquid output parameters of the tap wherein the cartridge is installed.

This cartridge is characterised in that it comprises:
- at least one triaxial magnetic field detection sensor with magnetic field intensity measuring elements in each of the three Cartesian axes (X,Y,Z);
- a magnetic field generating element attached to the movement of the controller or handle coupled to the cartridge;
- means of processing the information received by the sensor and sending the information relating to the position of the controller or handle to a device for regulating the mixing of liquids and regulating the flow rate;

In this configuration, the magnetic triaxial sensor is also characterised in that it is located on a static base of the cartridge with one of the three Cartesian axes of detection significantly coaxial or parallel to the axis of rotation of the controller or handle of the cartridge.

In the same way, this configuration is also characterised in that the position of the element generating the magnetic field, when the controller or handle in its inclination movement is approximately halfway along its path, is significantly centred on this axis of rotation of the controller or handle of the cartridge and, therefore, also significantly centred on the corresponding Cartesian axis of detection significantly coaxial or parallel with respect to this axis of rotation of the controller or handle of the cartridge. It should be understood that the axis of rotation of the controller or handle is coaxial with the axis of rotation of the cam in the rotation movement of the controller or handle of the tap With this solution, it is advantageous to have measurement means formed by the magnetic triaxial sensor, which are static, allowing no variations in measurements caused by unexpected backlash or displacement of the base containing the magnetic triaxial sensor, allowing a more precise calculation of the position of the magnet.

The solution described above ensures that there are no moving electrical connection elements from the magnetic triaxial sensor to fixed parts of the cartridge, so there is no risk of damage to the cables due to mechanical fatigue or deterioration due to friction and wear, additional space consumption for driving in a very limited available space, affecting the conductive material of the moving cable to the magnetic field, etc.

Advantageously, the configuration of the magnetic field generating element in a position significantly centred on the corresponding Cartesian axis of detection, coaxial or parallel to the axis of rotation, when the controller or handle is approximately in the middle of the lifting path, allows a symmetrical pattern to be obtained with respect to the axis of rotation in the field intensity measured in the inclination and rotation displacements of the magnetic field generating element with respect to the central position of inclination of the controller or handle and the position of the magnetic triaxial sensor.

This previous feature allows a better use of the available measurement range of the magnetic sensors, advantageously symmetrical in positive and negative intensity, achieving a higher resolution and measurement accuracy in all its range of positions, especially in the extreme positions, and simplifying the subsequent calculations that relate the measurements made by the magnetic triaxial sensor with the position in inclination and rotation of the controller or handle.

On the other hand, the described configuration allows the position of the controller or handle in any of the types of movement that this controller or handle carries out to be measured with a single magnetic field generating element and with a single magnetic triaxial sensor. In this way, as there is only one magnetic field generating element, there are no superpositions of several fixed magnetic fields, which, due to the relative movement of the elements that generate them, create variable resulting magnetic fields that would make the necessary mathematics difficult to determine the position of the field generating elements.

In a possible embodiment of the invention, the magnetic field generating element is installed at the base of a plate or similar, pulled by the controller or handle, and which performs its movement in a plane significantly parallel to the plane of the two Cartesian axes of detection which are significantly perpendicular to the axis of rotation of the handle, this magnetic field generating element is placed in a position on the plate such that the distance from the magnetic field generating element to the magnetic triaxial sensor in this revolution movement and rotation path in its plane is minimal when the controller or handle in its inclination movement is approximately halfway along its path.

For this configuration, where the magnetic field generating element makes a movement in a plane, the symmetrical pattern in the field intensity measured from this point of average inclination of the controller or handle and its minimum distance to the magnetic triaxial sensor at this point, allows the position of the controller or handle along its entire path to be determined with greater resolution, and notably simplifies the mathematical apparatus necessary to determine the position in elevation and rotation of the controller or handle.

In another possible embodiment of the invention, the magnetic field generating element is installed at the base of a cam that acts as a kinematic chain connected to the movement of the controller or handle, and makes a significantly spherical movement, placing the magnetic field generating element in a position such that the distance from the magnetic field generating element to the magnetic triaxial sensor in the said inclination path is minimal when the controller or handle in its inclination movement is approximately halfway along its path.

The benefits related to the accuracy of the position measurement and simplification of the mathematics described in the previous embodiment, are observed in the same way in this other possible embodiment, since for a configuration where the magnetic field generating element performs a spherical movement, the symmetrical pattern in the measured field intensity from this point of average inclination of the controller or handle and its minimum distance to the magnetic triaxial sensor at this point, allows the position of the controller or handle along its entire path to be determined with greater resolution in the same way, and notably simplifies the mathematical apparatus necessary to determine the position in elevation and rotation of the controller or handle.

Preferably, the magnetic triaxial sensor must be significantly centred in relation to the side walls of the cartridge. This places it at the maximum possible distance from any of the walls of the cartridge, which is the most favourable point for the measurement of the field intensity generated by the magnet to be less affected by external magnetic fields such as magnetic fields caused by the metal of the tap body and even by magnetic fields outside the tap.

According to an embodiment of the invention, the axis defined between the magnetic poles of the magnetic field generating element is moved and rotated following the movement of the controller or handle, the angular orientation of the projection of the axis of the magnetic field generating element on a plane significantly perpendicular to said axis of rotation of the controller or handle, is determined by the composition/relationship of the magnetic field intensity components that are measured by each of the two Cartesian axes of detection of the magnetic sensor that define a plane significantly perpendicular to the axis of rotation of the controller or handle.

In addition to this, the position of the magnetic field generating element in its inclination path is determined by the field intensity component measured in the sensing axis of the sensor that is significantly coaxial to the axis of rotation of the controller or handle.

As an alternative to the above, in addition to the components of the magnetic field intensity measured in the two detection axes forming the plane perpendicular to the axis of rotation of the handle, the means of processing information must be related to determine the angular orientation of the handle in its rotation path, the position of the magnetic field generating element in its inclination path is determined by the modulus of the field intensity measured in these two detection axes which form the plane perpendicular to the axis of rotation of the controller or handle, together with the sign of the field intensity component measured in the detection axis of the sensor significantly coaxial to the axis of rotation of the controller or handle.

In addition to the above alternative form, and optionally, two or three of the measured field intensity components are compared with pairs or trios of values stored in a two-dimensional reference matrix to recognise and discriminate disturbances in the magnetic field produced by magnetic field sources outside the cartridge that affect the measurement of the magnetic sensor.

In a possible embodiment of the invention, the cartridge has two or more magnets stacked in series, as elements of magnetic field generation. The resulting magnetic field may be more suitable for the application described in the present invention than that created by a magnet of simple geometrical shape (cylinder, prism etc.).

In an alternative embodiment to the above, the cartridge has two or more magnets separated from each other, with their North-South axes aligned and without relative movement between them, as magnetic field generating elements, distributed symmetrically with respect to the magnetic triaxial sensor when the lifting path of the handle or controller is approximately halfway along its path. The resulting magnetic field may be more suitable for the application described in the present invention than that created by a magnet of simple geometrical shape (cylinder, prism etc.), for example, when the displacement made by the magnet in the lifting movement of the handle or controller is of considerable length.

Also in accordance with the purpose of the invention, according to a second aspect, the present invention provides an electronic tap that has, at least, a cartridge with magnetic triaxial sensor for the detection of the position of the controller or handle as described in the previous paragraphs, which also has, at least, a controller or handle with a turning and/or inclination movement, as well as auxiliary or simultaneous processing means to those of the cartridge, which send the instructions for the configuration of the mixture to be supplied by the tap and/or the functions associated with the position of the controller or handle to the corresponding devices forming the liquid supply assembly.

This electronic tap configuration has the advantages associated with the efficient, precise and reliable determination of the position of the handle or controller, allowing the user to know and manage, through the means of processing information, the mixing and flow regulation that they want with their movement on the handle or controller.

As an option, the electronic tap can be equipped with a controller or handle with additional increased rotation and/or inclination paths after the first stops found in these paths, where the magnetic triaxial position sensor of the controller or handle detects this position in these increased paths, allowing the basic functionality of a conventional mechanical mixing and flow regulation cartridge to be considerably extended.

In this previous configuration with increased paths, the means of processing information preferably establish a position measurement area after the first stop encountered on the path, within the increased path, in which the mixture and liquid flow configuration is not altered and existing functions, such as safety against unintentional actuation by the user, backlash and hysteresis of the kinematic chain and resolution of the electronics, are not activated or deactivated.

Also, optionally, although preferably, and in order to achieve the effect of having an arrangement that is best against outside interference from any point against the tap, the walls of the tap are at the maximum possible distance from all sides, with respect to the position of the cartridge.

The processing of the measurements and regulation of the liquid supply media in the flow and mixing parameters established by the user, which are preferably located in the cartridge, although they can be complemented by means of processing information external to the cartridge, can include a function for normalising the measurements made by the sensors, being able to perform on these measurements, among others, scaling, deforming, rotation, revolution, linearization, etc., in order to homogenize them before interpreting them as flow, temperature and special functions for the device that manages the mixing.

BRIEF DESCRIPTION OF THE SEVERAL VIEWS OF THE DRAWINGS

In order to better understand the description made, a set of drawings has been provided which, schematically and solely by way of non-limiting example, represents a practical case of embodiment.

DETAILED DESCRIPTION

Figure 1:
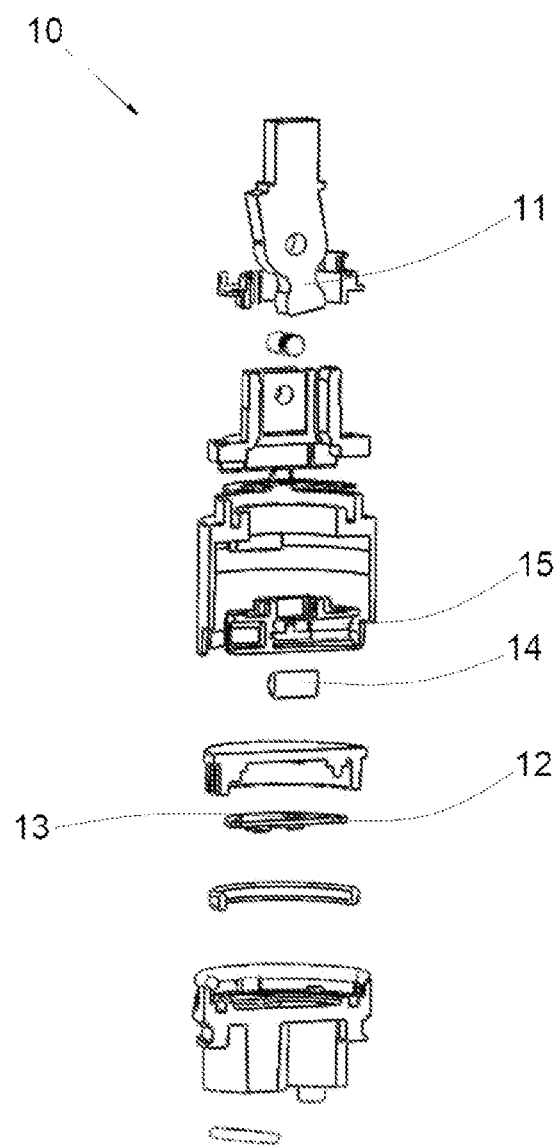
FIG. 1 is a exploded view of the cartridge with the magnetic triaxial sensor.
Figure 2:
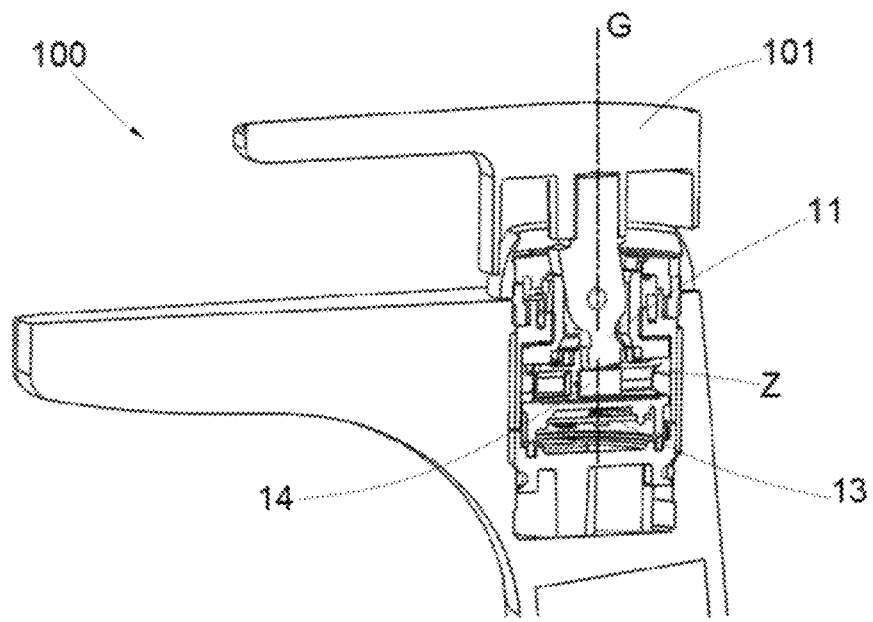
FIG. 2 is a sectional view of the cartridge with magnetic sensor installed on an electronic tap.
Figure 3:
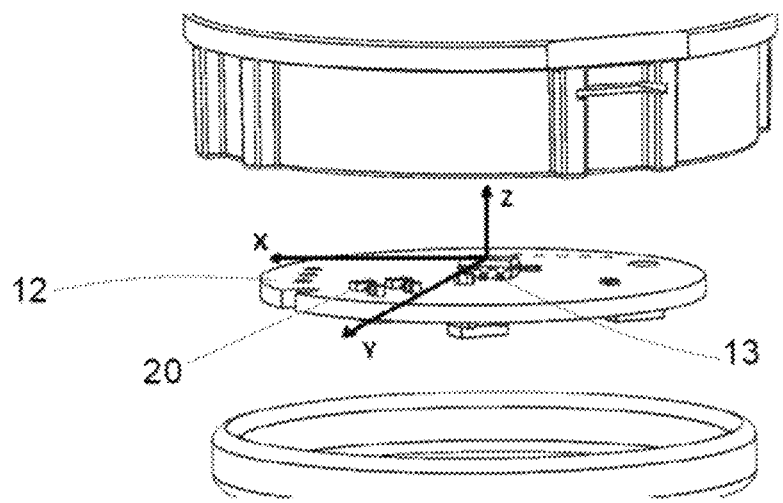
FIG. 3 is a detailed perspective view of the location of the magnetic sensor in the cartridge.

In the present preferred embodiment of the invention, as can be seen in FIGS. 1, 2 and 3, there is a cartridge (10) installed in a single handle type domestic water tap (100), which has a handle (101) by which the user regulates the proportion of the hot and cold water mixture and the supply flow rate.

The handle (101) transmits its rotation and inclination movement to a cam (11) which performs the rotation movement following the rotation of the handle (10), on a rotation (G) and revolution axis by the inclination movement of the handle (101).

Opposite to this cam (11), the cartridge (10) has a static base (12) wherein a magnetic triaxial sensor (13) is located. This sensor (13) is installed so that one (Z) of the three Cartesian axes of detection is significantly coaxial with respect to the axis of rotation of the handle (101) which is the same axis of rotation (G) as that of the cam (11) of the cartridge (10). The magnetic triaxial sensor (13) is significantly centred in relation to the side walls of the cartridge (10).

In the present embodiment, the magnet (14) is installed on a base of a plate (15) or similar which is pulled by the handle (101), making its movement in a plane which is significantly parallel to the plane of the two Cartesian axes (X,Y) of detection (13), substantially perpendicular to the axis of rotation (G) of the handle (101), this magnet (14) being placed in a position on the plate such that its distance from the magnetic triaxial sensor (13) is minimal when the controller or handle (101), in its inclination movement, is approximately halfway along its path (M).

In alternative embodiments, a magnet (14) is used as a magnetic field generating element, located at the base of a cam, this magnet (14) moves in conjunction with the movement of this cam, forming a spherical surface with positions through which the magnet (14) passes, with the centre at the junction of the axis of rotation and the lifting axis of this cam. When the handle (101) in its inclination movement is approximately halfway along its path (M), this magnet is significantly centred on the axis of rotation (G) of the handle (101) and the cam (11) of the cartridge (10) and therefore also significantly centred on the corresponding Cartesian axis (Z) of detection significantly coaxial or parallel to this axis of rotation (G) of the handle (101) of the tap (100).

Figure 4:
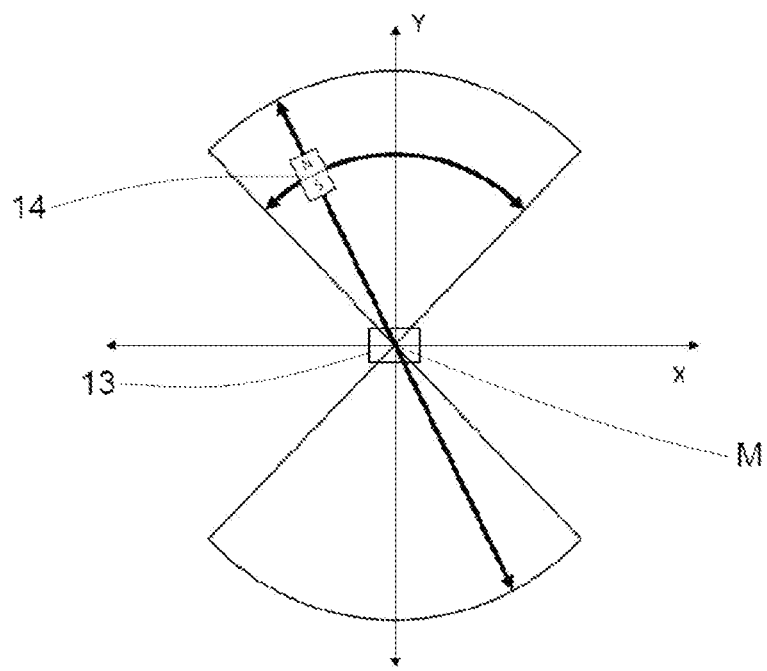
FIG. 4 is a representation in the plane perpendicular to the axis of rotation of the knob or handle of the projections of the positions that the magnet located on a plate or on a cam associated with the handle of a single handle tap can take with respect to the position of the magnetic triaxial sensor.

In these embodiments, as can be seen in FIG. 4, the possibilities of positioning the magnet (14) are determined by the rotation of the handle (101) and by its inclination, such that the projections of these positions of the magnet (14) in the plane formed by the other two measuring axes (X,Y), perpendicular to each other and with the first one (Z), create a symmetrical pattern in the field intensity measured in the inclination and rotation displacements of the magnet (14) with respect to this axis (Z).

The magnet (14) is moved and rotated following the movement of the handle (101). The angular orientation ($\varphi$) of the projection of the magnet axis (14) on the plane formed by the Cartesian measuring axes (X,Y) of the sensor (13), is determined by the composition/relationship of the magnetic field intensity components that are measured by each of these two Cartesian measuring axes (X,Y) of the magnetic triaxial sensor (13). This relationship between the magnetic field strengths (Bx, By) measured on the Cartesian axes (X, Y) of the sensor of the magnetic triaxial sensor (13) is given by its tangent (tan $\varphi$=By/Bx) and provides this angular orientation of the magnet (14).

In this embodiment, the field intensity component measured in the detection axis (Z) of the sensor (13), which is significantly coaxial to this axis of rotation (G) of the handle, determines the position of the handle (101) in its inclination path.

In an alternative embodiment, the field intensity module measured in these two detection axes (X,Y), which form the plane perpendicular to the axis of rotation (G) of the handle, together with the sign of the field intensity component measured in the detection axis (Z) of the magnetic triaxial sensor (13), which is significantly coaxial to the axis of rotation (G) of the handle, determines the position of the handle (101) in its inclination path.

The cartridge (10) is equipped with means for processing the field intensity measured by the magnetic triaxial sensor (13) which determine the position of the controller or handle according to the above-mentioned current ratios in the plane (X,Y), together with the two previous alternative ways of using the current value modules in those axes (X,Y) or in the axis (Z) coaxial to the axis of rotation (G).

The means of processing information may also alternatively have two or three of the measured field intensity components and compare them with pairs or trios of values stored in a two-dimensional reference matrix to recognise and discriminate magnetic field disturbances from sources outside the cartridge that affect the measurement of the magnetic sensor.

The means of processing information send the information related to the position of the handle (101) to a regulating device, not shown in the figures, for mixing liquids and regulating the flow, in this case outside the tap itself (100);

In the present embodiment there is only one magnet (14), with a single magnetic triaxial sensor (13), although in alternative embodiments two or more magnets may be stacked in series or, alternatively, two or more magnets aligned and separated from each other, preferably distributed symmetrically with respect to the magnetic triaxial sensor when the lifting path of the handle or controller is approximately halfway along its path.

Alternatively, the electronic tap has a handle with additional increased rotation and inclination paths after the first stops found in these paths, wherein the magnetic triaxial position sensor of the controller or handle detects this position in these increased paths, extending the functionality of the tap, allowing additional functions to those of flow and temperature control.

In this alternative embodiment with increased paths, the means of processing information establish a position measurement area after the first stop encountered on the path, within the increased path, in which the configuration of the water mixture is not altered, nor are existing functions activated or deactivated, such as safety against unintentional actuation by the user, backlash and hysteresis of the power train and resolution of the electronics.

Despite the fact that reference has been made to a specific embodiment of the invention, it is clear to a person skilled in the art that the electronic tap cartridge with a magnetic triaxial sensor, in the three Cartesian axes, for the detection and determination of the position of the controller or handle, as well as the electronic tap containing it, is susceptible to numerous variations and modifications, and that all the details mentioned can be replaced by others that are technically equivalent, without departing from the scope of protection defined by the attached claims.

What is claimed is:

1. An electronic tap cartridge with a magnetic triaxial sensor for detecting a position of a controller or handle, which is installed on an electronic tap and to which the controller or handle is attached with at least a turning and inclination movement for manual regulation of liquid outlet parameters of the tap where the cartridge is installed, characterized in that the electronic tap cartridge comprises: a triaxial magnetic field sensing magnetic sensor with magnetic field intensity measuring elements in each of three Cartesian axes; a magnetic field generating element connected to the movement of the controller or handle coupled to the cartridge, wherein the magnetic field generating element moves in conjunction with the controller or handle; means of processing information received by the triaxial magnetic field sensing magnetic sensor and sending information relating to the position of the controller or handle to a device for regulating the mixing of liquids and regulating the flow rate; wherein the triaxial magnetic field sensing magnetic sensor is located on a static base of the cartridge with one of the three Cartesian axes of detection significantly coaxial or parallel to an axis of rotation of the controller or handle of the cartridge, and wherein the position of the magnetic field generating element, when the controller or handle in its inclination movement is approximately halfway along a path of the controller or handle, is significantly centered on that axis of rotation of the controller or handle of the cartridge and significantly centered on the corresponding Cartesian axis of detection significantly coaxial or parallel to that axis of rotation of the controller or handle of the cartridge.

2. The electronic tap cartridge with the magnetic triaxial sensor for detecting the position of the controller or handle, in accordance with claim 1, wherein the magnetic field generating element is installed at the base of a plate or similar, pulled by the controller or handle, and which performs its movement in a plane that is significantly parallel to the plane of two Cartesian axes of the sensor, significantly perpendicular to the axis of rotation of the handle, with the magnetic field generating element being placed in such a position that the distance from the magnetic field generating element to the magnetic triaxial sensor in this travel path in its plane of rotation is minimal when the controller or handle in its inclination movement is approximately halfway along its path.

3. The electronic tap cartridge with the magnetic triaxial sensor for detecting the position of the controller or handle, in accordance with claim 1, wherein the magnetic field generating element is installed at a base of a cam that acts as a kinematic chain connected to the movement of the controller or handle, and makes a significantly spherical movement, by placing the magnetic field generating element in such a position that the distance from the magnetic field generating element to the magnetic triaxial sensor in this inclination path is minimal when the controller or handle in its inclination movement is approximately halfway along its path.

4. The electronic tap cartridge with the magnetic triaxial sensor for detecting the position of the controller or handle, in accordance with claim 1, wherein the magnetic triaxial sensor is significantly centered with respect to side walls of the cartridge.

5. The electronic tap cartridge with the magnetic triaxial sensor for detecting the position of the controller or handle, in accordance with claim 1, wherein the axis defined between the magnetic poles of the magnetic field generating element moves and rotates following the movement of the controller or handle, wherein the angular orientation of the projection of that position of the axis of the magnetic field generating element in a plane substantially perpendicular to the axis of rotation of the controller or handle, is determined by the composition of magnetic field intensity components which are detected by each of the two Cartesian axes of detection of the magnetic sensor defining a plane substantially perpendicular to the axis of rotation of the controller or handle.

6. The electronic tap cartridge with the magnetic triaxial sensor for detecting the position of the controller or handle, in accordance with claim 5, wherein the position of the magnetic field generating element in its inclination path is determined by a field intensity component measured in the detection axis of the magnetic triaxial sensor, significantly coaxial to the axis of rotation of the controller or handle.

7. The electronic tap cartridge with the magnetic triaxial sensor for detecting the position of the controller or handle, in accordance with claim 5, wherein the position of the magnetic field generating element in its inclination path, determined by a module of the field intensity components measured in these two detection axes that form the plane perpendicular to the axis of rotation of the controller or handle, together with a sign of the measured field intensity component on the detection axis of the magnetic triaxial sensor, significantly coaxial to the axis of rotation of the controller or handle.

8. The electronic tap cartridge with the magnetic triaxial sensor for detecting the position of the controller or handle, in accordance with claim 1, wherein the tap has the controller or handle with additional increased rotation and/or inclination paths after first stops of the rotation and/or inclination movement found in these paths, wherein the magnetic triaxial sensor of the controller or handle-detects this position in these increased paths.

9. The electronic tap cartridge with the magnetic triaxial sensor for detecting the position of the controller or handle, in accordance with claim 1, wherein the means of processing information establish a measuring zone after the first stop found in the path, within the increased path, in which the configuration of the liquid mixture and flow rate is not altered nor existing functions are not activated or deactivated.

* * * * *